Dec. 29, 1942.   P. H. CHASE   2,306,591
ELECTRIC PROTECTIVE SYSTEM
Original Filed Nov. 25, 1938   3 Sheets-Sheet 3

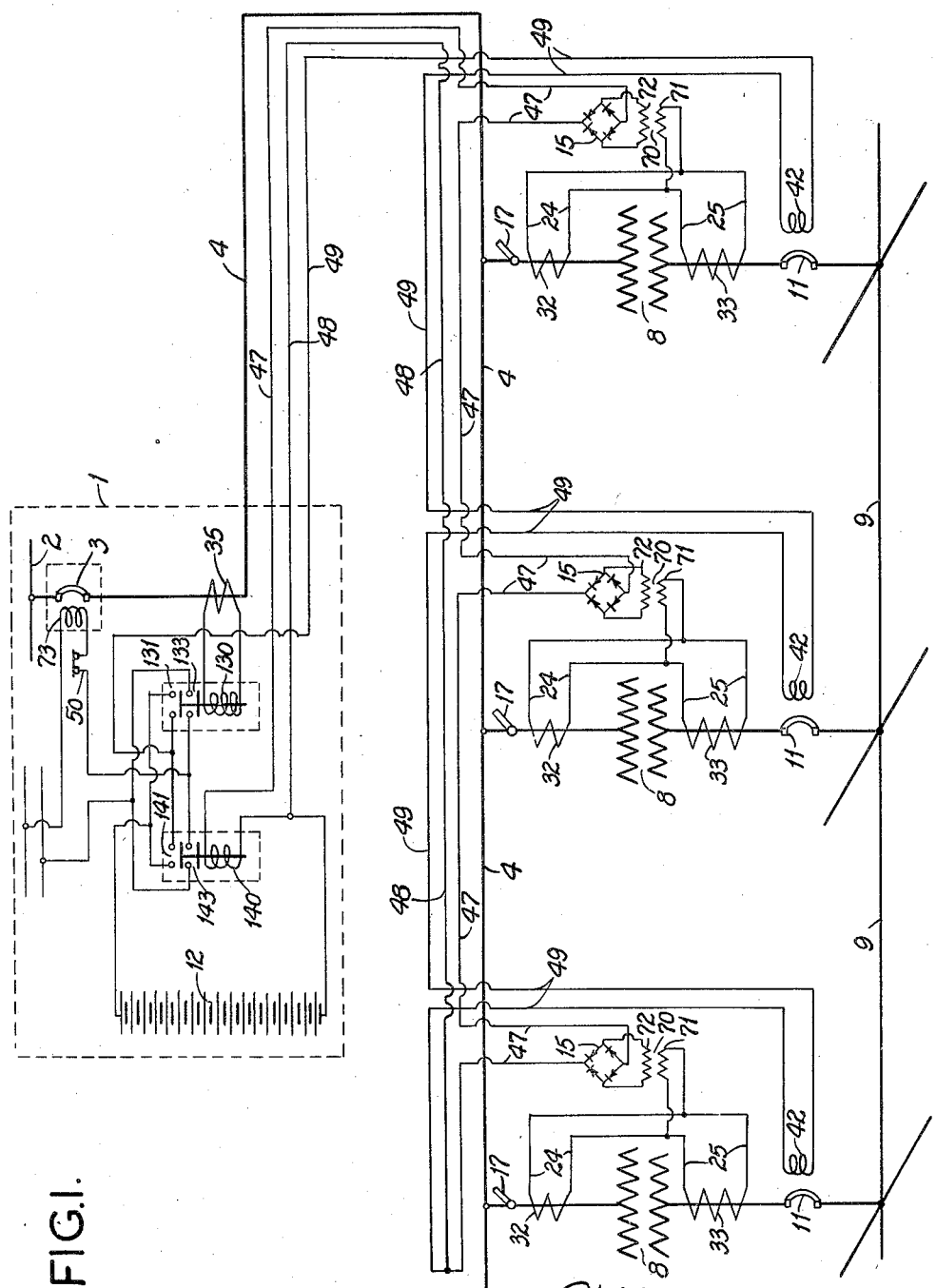

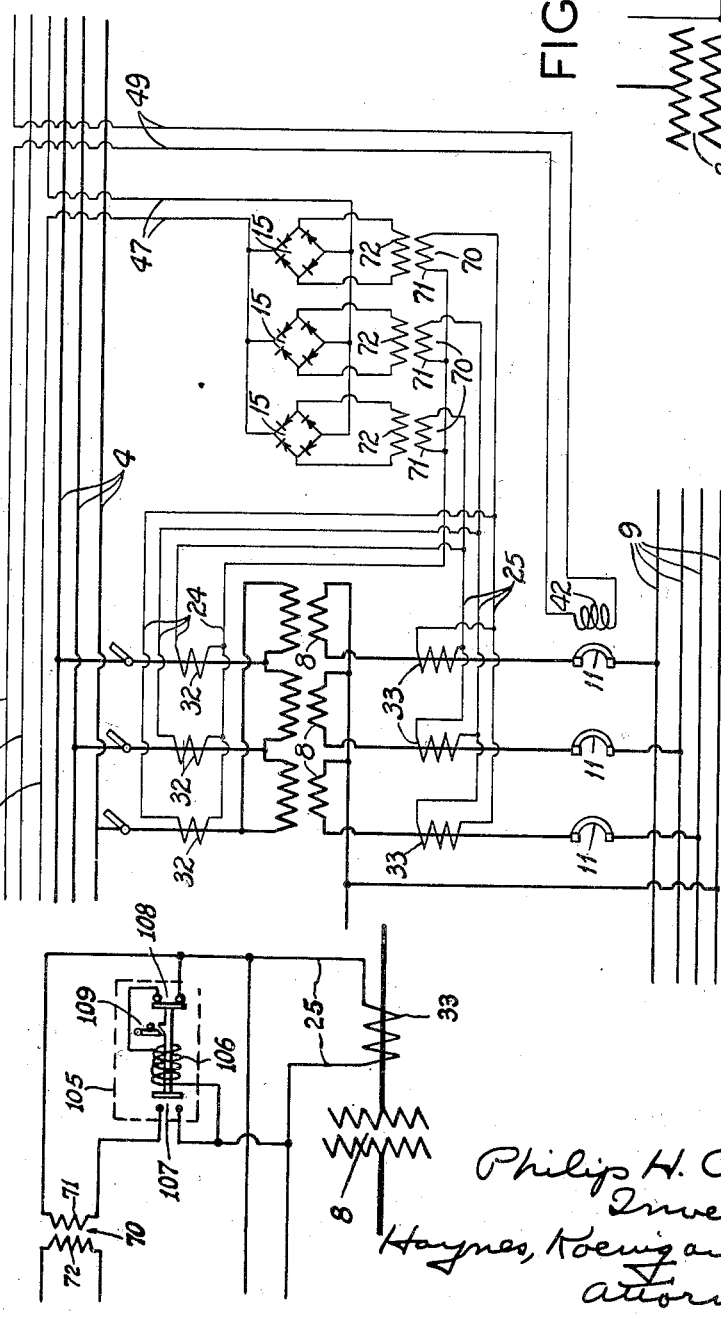
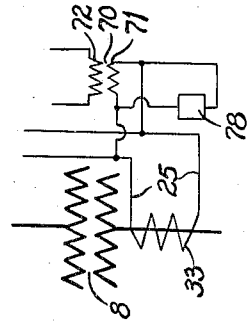

Philip H. Chase,
Inventor.
Haynes, Koenig and Wolf.
Attorneys.

Patented Dec. 29, 1942

2,306,591

UNITED STATES PATENT OFFICE 2,306,591

ELECTRIC PROTECTIVE SYSTEM

Philip H. Chase, Bala Cynwyd, Pa.

Original application November 25, 1938, Serial No. 242,233, now Patent No. 2,199,658, dated May 7, 1940. Divided and this application April 20, 1940, Serial No. 330,744

11 Claims. (Cl. 175—294)

This invention relates to electric protective systems, and with regard to certain more specific features, to such systems for low-voltage, alternating-current, distribution networks supplied from a plurality of transformer taps on one or more distribution feeders.

The invention is a division of the invention disclosed in the United States patent application Serial No. 242,233, filed by myself on November 25, 1938, for Electric protective system, eventuated into Patent 2,199,658, dated May 7, 1940.

Among the several objects of the invention may be noted the provision of means to provide an improved protective system for multiple-fed alternating-current distribution networks; to provide a highly sensitive protective system under fault conditions in distribution transformers; to provide a protective system which operates with a predetermined degree of sensitivity on primary feeder faults and a predetermined higher degree of sensitivity on transformer faults; to provide different degrees of sensitivity of fault protection on the various branches of a circuit; to safeguard against the extended development after inception of faults in apparatus and equipment; to provide simple and effective means for isolating sections of an electric power generation, transmission or distribution system and thereby minimize interruptions due to failure of equipment, feeders, or mains; and the attainment of a high degree of reliability of service with a small number of simple protective and circuit-interrupting devices. Other objects will be in part obvious and in part pointed out hereinafter.

The invention accordingly comprises the elements and combinations of elements, features of construction, and arrangements of parts which will be exemplified in the systems and structures hereinafter described, and the scope of the application of which will be indicated in the following claims.

In the accompanying drawings, in which are illustrated several of various possible embodiments of the invention, Fig. 1 is a simplified schematic, single-phase wiring diagram showing the invention;

Fig. 2 is a full-line, three-phase schematic diagram illustrating pilot wire connections for a transformer bank of Fig. 1;

Fig. 3 is a fragmentary view of a part of Fig. 1, showing the application of a harmonic filter;

Similar reference characters indicate corresponding parts throughout the several views of the drawings.

Figure 5:
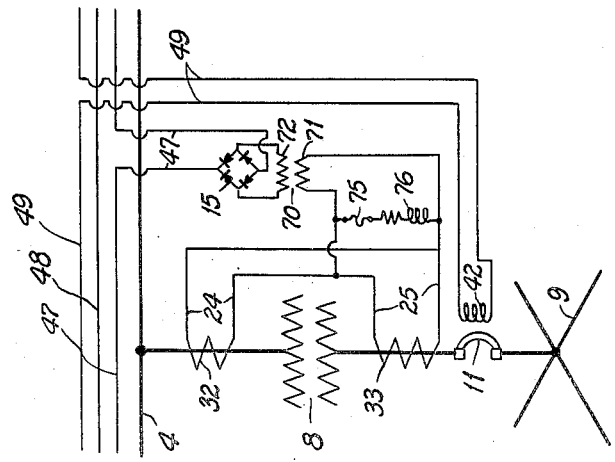
Figs. 4 and 5 are simplified schematic single-phase wiring diagrams illustrating modifications of the apparatus associated with the tap sections shown in Figs. 1–3; and, Fig. 6 is a diagram similar to Fig. 4, showing a modification.

The improvements relate more specifically to systems of low-voltage alternating-current distribution networks supplied from a plurality of primary distribution feeders and transformers, but are also applicable to transmission and to power station and sub-station apparatus, buses, etc.

In any interconnected electric distribution system, it is necessary to utilize methods of protection which will discriminate between a fault on one part or section of the system and a fault on another section of the system, so that only the predetermined faulted section of the system will be removed from service at the time of fault.

In electric distribution systems having a high ratio of voltage transformation between the primary feeders and the secondary (lower voltage) mains, there is a wide range between the magnitude of primary fault current resulting from faults on primary feeders and from faults in transformers or on the secondary portions of the system. This situation results in practical difficulties when it is desired to protect primary feeders with associated transformers, as a unit, as is often done in modern low-voltage alternating-current network systems. Transformer faults, particularly on the low-voltage windings of high ratio transformers, require a relatively high degree of protection sensitivity, due to the fault-current from the primary feeder being limited by transformer impedance. Primary feeder faults produce a much larger fault current, relatively to the above mentioned transformer faults.

On radial primary distribution feeders, in which the primary feeder and all of its associated transformers are connected as a unit, simple overload protection at the supply end of the primary feeder cannot be entirely depended upon for prompt action in the case of transformer faults, since the primary current resulting from such faults often is only a small percentage of the full load rating of the feeder until the fault has developed to an undesirable magnitude.

Thus, under some conditions it is insufficient merely to include the primary feeder and associated transformer banks in a common overload protective system, on account of the wide range of sensitivity required on transformer faults and primary feeder faults.

It is therefore evident that a protective system designed to isolate primary feeders and their associated transformers, or generally to isolate apparatus, buses, sections of circuits and the like, should have a high level of response to various types of faults which produce a wide range in the magnitude of fault current, and at the same time should discriminate between local faults and through faults.

One of the objects of this invention, namely, to provide a high degree of sensitivity for transformer faults, is accomplished by unique arrangements of circuits and equipment whereby the over-all protective scheme may be made highly sensitive to a transformer fault and also discriminate between a local fault and a through fault.

The present invention affords multiple-level sensitivity, applied to continuous (non-sectional) radial primary distribution feeders and transformers in which the entire primary feeder and all of its associated transformers are controlled as a unit, utilizing direct current in the protective system.

Referring now more particularly to Fig. 1, there is illustrated at 1 a sub-station supplying an electric distribution system (one feeder shown) comprising sub-station circuit breaker 3, non-sectional, radial primary feeder 4, distribution transformers or transformer banks 8, low-voltage circuit breakers 11 and secondary mains 9, generally networked.

The primary feeder is provided with overload protection at the sub-station and the transformer banks are each provided with individual high sensitivity differential protection. The primary feeder and transformer protective systems are so arranged that in the event of a fault, on either the primary feeder or on one of the individual transformer banks, the primary feeder is disconnected at the sub-station and all transformer banks are disconnected from the low-voltage mains.

Each transformer bank 8 is provided with a two-way balanced circulating current protective circuit consisting of current transformers 32 in the primary leads connected by wires 24 and 25 to current transformers 33 in the secondary leads. A current-voltage transformer (i. e., for example, a transformer having an air gap in the magnetic circuit) 70 has its current winding 71 connected across normally equi-potential points of the differential circuit 24, 25 and its voltage winding 72 is connected to the A.-C. terminals of A.-C. to D.-C. rectifier bridge 15.

The ratios of current transformers 32 and 33 are directly proportional to the primary and secondary currents respectively of transformer bank 8. Under the condition of normal operation, or fault external to transformer bank 8, the relative polarity of current transformers 32 and 33 is such that a circulating current flows in the differential circuit 24, 25 with zero or negligible current in winding 71 of current-voltage transformer 70.

In the event of a fault in a transformer bank 8, there is a reversal (or change) from the normal relative polarity of current transformers 32 and 33, current is caused to flow through winding 71 of current-voltage transformer 70 and there is A.-C. voltage induced in winding 72, substantially in proportion to the current in winding 71. This A.-C. voltage is converted to D.-C. voltage by rectifier 15 and produces a D.-C. current in the series pilot wire circuit consisting of pilot wires 47, 48, all other rectifiers 15 and winding of relay 140 in the sub-station.

The operation of relay 140 closes its contacts 141 and 143. The closing of contacts 143 energizes trip coil 73 which trips the feeder breaker 3 at the sub-station, thus disconnecting the feeder and all transformers from the sub-station supply. The tripping of the feeder breaker 3 opens auxiliary switch 50. A circuit is also completed from the positive terminal of a source 12 (illustrated as a battery) through closed contacts 141 of relay 140, pilot wire 49, all trip coils 42 of secondary breakers 11 and return to negative terminal of D.-C. source 12 over pilot wire 48. The trip coil 42 of each secondary breaker 11 is thereby energized from the D.-C. source 12 in the sub-station, tripping all secondary breakers 11 and disconnecting all transformer banks of the feeder from the low-voltage mains 9.

It is clear that the rectifiers 15 may be connected in parallel, instead of series, in the pilot wire circuit, and/or the trip coils 42 may be connected in parallel.

In the event of a fault on primary feeder 4, there is no reversal from the normal relative polarity of current transformers 32 and 33 on the various transformer banks 8. There is, however, sufficient current supplied from current transformer 35 to operate inverse-time over-current relay 130.

The operation of relay 130 closes its contacts 131 and 133. The closing of contacts 133 energizes trip coil 73 which trips the feeder breaker 3 at the sub-station, and of contacts 131 energizes the trip coils 42 of all secondary breakers 11 as previously described for a fault in a transformer bank and the secondaries of all transformer banks 8 of the faulted feeder are disconnected from the secondary mains 9 by opening of the secondary breakers 11.

Fig. 2 is a full-line schematic diagram showing the pilot wire connections for a transformer bank of Fig. 1 for a three-phase circuit. Like numerals designate like parts, and in view of the obviousness of the drawings, further description is believed to be unnecessary.

A harmonic filter may be included in shunt with winding 71 of current-voltage transformer 70 in order to prevent operation of the protective system due to transient non-faulted conditions, and yet retain a high degree of sensitivity under local faults. This is shown in Fig. 3 at numeral 78.

Thus the desired degree of sensitivity of the protective system on each transformer 8 to faults therein may be secured independently of the degree of sensitivity, determined by current transformer 35 and relay 130, to primary feeder faults.

Figure 4:
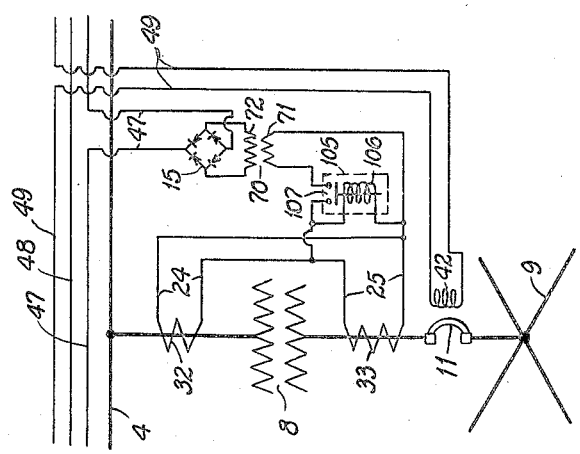

Figs. 4 and 5 illustrate other methods which may be used to connect the two-way differential circuit across the transformer bank to the A.-C. to D.-C. rectifier.

Fig. 4 illustrates a relay 105 with its winding connected across the normally equi-potential points of the two-way differential circuit 24, 25. Winding 71 of the current-voltage transformer is connected across the two-way differential circuit through the contacts 107 of relay 105, which contacts are closed upon operation of the relay due to occurrence of a transformer fault.

As shown in Fig. 6, relay coil 106 may be connected through a supplemental set of contacts 108 (circuit-opening) so that when local fault conditions occur the relay coil ceases to be a path in shunt with winding 71. In this case the relay 105 should lock out when it operates as indicated at 109. The relay 105 has proper time-current characteristics to secure a high degree of sensitivity on transformer faults and avoid faulty operation due to inaccuracies of current transformers on high current through faults, or to other transient conditions.

Fig. 5 illustrates a fuse in parallel with winding 71 of the current-voltage transformer. The blowing of the fuse under transformer fault conditions makes winding 71 operative as hereinabove described. The fuse, with proper time current characteristics, and impedance 76 in series with the fuse are co-ordinated in their characteristics to render the protective system highly sensitive to transformer faults and insensitive to through faults and to other transient conditions.

The conversion of fault current in the individual transformer protective circuit to direct-current is advantageous in several respects, including a reduction in number and size of pilot wires.

Herein the term "closed circuit" refers both to circuits wherein closure is entirely effected conductively or inductively or both.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An electric protective system comprising a continuous feeder, trip means adapted to cut off said feeder, a tap connected to said feeder, a transformer in the tap having primary and secondary sides, protective means having an inductive connection with the feeder, and adapted to open the trip means in response to abnormal current in the feeder, a differential circuit inductively connected to both sides of said transformer, a primary winding connected across said differential circuit at points of equal potential, a secondary winding associated with the last-named primary winding, a direct-current circuit connected so that when energized said trip means is opened, and rectifying means between said secondary winding and said direct-current circuit.

2. An electric protective system comprising a continuous radial feeder, a tap connected to the feeder, a circuit breaker in said tap, a circuit breaker in the feeder, a balanced circulating-current circuit inductively connected to the tap, a transformer having a primary connected across equi-potential points in said circulating circuit, a secondary in said transformer, a rectifier associated with said secondary to produce direct current, a direct-current circuit fed by said rectifier, relay means, said relay means having a winding in said direct-current circuit said relay means being operated from the direct-current circuit, operation of said relay means effecting tripping of the circuit breakers in the feeder and in the tap in response to current in the direct-current circuit caused by abnormal conditions.

3. An electric protective system comprising a continuous radial feeder, trip means adapted to cut off said feeder, a tap connected to said feeder, a transformer in the tap having primary and secondary sides, a circuit connected inductively to both sides of said transformer, a primary winding connected across said circuit at points of equal potential, a secondary winding associated with the last-named primary winding, and a direct-current circuit connected between said secondary winding and said trip means, whereby the trip means is opened when the circuit is unbalanced.

4. An electric protective system comprising a continuous radial feeder from a sub-station, trip means at the sub-station adapted to cut off said feeder, a tap connected to said feeder, a transformer in the tap having primary and secondary sides, a differential circuit connected inductively to both sides of said transformer, a primary winding connected across said differential circuit at points of equal potential, a secondary winding associated with the last-named primary winding, a direct-current circuit connected so that when energized said trip means is opened, and rectifying means between said secondary winding and said direct-current circuit.

5. An electric protective system comprising a continuous radial feeder, trip means adapted to cut off said feeder, a tap connected to said feeder, tap-responsive protective means comprising a transformer in the tap having primary and secondary sides, a differential circuit inductively connected to both sides of said transformer, a primary winding connected across said differential circuit at points of equal potential, a secondary winding associated with the last-named primary winding, a direct-current circuit connected to the secondary winding so that when energized by said differential circuit said trip means is opened and comprising a relay, and trip means in the tap adapted to be operated by said relay to disconnect the tap from its load, and another feeder protective means having an inductive connection with the feeder and comprising a relay, and adapted to open the trip means in the feeder in response to abnormal current in the feeder, the tap-responsive protective means providing a more sensitive response per unit of fault current than the feeder protective means.

6. In an electrical distribution system from a sub-station, a continuous radial primary feeder, a sub-station circuit breaker in said feeder, a tap from the feeder, a transformer in the tap, a primary winding and a secondary winding in the transformer, a circuit breaker in the tap on the secondary side of the transformer, a two-way balanced circulating current-protective circuit associated with the tap, a current transformer in the protective circuit responding to the primary side of the tap, and a current transformer therein responding to the secondary side of the tap, a primary winding of a current-voltage transformer connected across equi-potential points of the protective circuit, a secondary winding for said current-voltage transformer consisting of a voltage winding, a rectifier fed by said voltage winding, a pilot wire circuit supplied from said rectifier, a relay between the pilot-wire circuit and said circuit breaker at the sub-station, said pilot wire circuit operating the circuit breaker at the sub-station, and also said circuit breakers in the secondary of the tap.

7. In an electrical distribution system from a sub-station, a continuous radial primary feeder, a sub-station circuit breaker in said feeder, a tap from the feeder, tap-responsive protective means comprising a transformer in the tap, a primary winding and a secondary winding in the transformer, a circuit breaker in the tap on the secondary side of the transformer, a two-way balanced circulating current-protective circuit associated with the tap, a current transformer in the protective circuit responding to the primary side of the tap, and a current transformer therein responding to the secondary side of the tap, a current-voltage transformer connected across equi-potential points of the protective circuit, a secondary for said current-voltage transformer consisting of a voltage winding, a rectifier fed by said voltage winding, a pilot wire circuit supplied from said rectifier, a relay operated by said pilot wire circuit, a trip coil for the sub-station circuit breaker operated by said relay, and a feeder protective means comprising a second relay having a circuit responsive to current in the radial feeder and adapted upon fault in the feeder to operate said trip coil of the sub-station circuit breaker, the tap-responsive protective means providing a more sensitive response per unit of fault current than the feeder protective means.

8. In an electrical distribution system from a sub-station, a continuous radial primary feeder, a sub-station circuit breaker in said feeder, a tap from the feeder, tap-responsive protective means comprising a transformer in the tap having a primary and a secondary, a circuit breaker in the tap on the secondary side of the transformer, a two-way balanced circulating current-protective circuit associated with the tap, a current transformer in the protective circuit responding to the primary side of the tap, and a current transformer therein responding to the secondary side of the tap, a current-voltage transformer connected across equi-potential points of the protective circuit, a secondary for said current-voltage transformer consisting of a voltage winding, a rectifier fed by said voltage winding, a pilot-wire circuit supplied from said rectifier, a relay operated by said pilot-wire circuit, a trip coil for the sub-station circuit breaker operated by said relay, and a feeder protective means comprising a second relay having a circuit responsive to current in the radial feeder and adapted upon fault in the feeder to operate said trip coil of the sub-station circuit breaker, a trip coil for said circuit breaker in the tap secondary, and means whereby either of said relays energizes said trip coil for the circuit breaker in the tap, the tap-responsive protective means providing a more sensitive response per unit of fault current than the feeder protective means.

9. An electric protective system comprising a continuous feeder, a tap connected to said feeder, a transformer in the tap having primary and secondary sides, a trip means on the secondary side, a differential circuit inductively connected to both sides of said transformer, a primary winding connectable across said differential circuit at points of equal potential, a secondary winding associated with said last-named primary winding, a relay connected across the differential circuit at points of equal potential and adapted to connect said primary winding under unbalanced conditions in the differential circuit, a trip coil for said trip means, a direct-current circuit connected so that when energized said trip means is opened by said trip coil, and rectifying means between said secondary winding and said direct-current circuit.

10. An electric protective system comprising a continuous feeder, a tap connected to the feeder, a transformer in the tap having primary and secondary sides, a trip means on the secondary side, a differential circuit inductively connected to both sides of said transformer, a primary winding connected across said differential circuit at points of equal potential, a secondary winding associated with the last-named primary winding, a trip coil for said trip means, a direct-current circuit connected so that when energized said trip coil opens said trip means, rectifying means between said secondary winding and said direct-current circuit, and a fuse connected in parallel with said primary winding adapted to blow under transformer fault conditions to unequalize the potential on the primary coil.

11. An electric protective system comprising a continuous feeder, a tap connected to the feeder, a transformer in the tap having primary and secondary sides, a trip means on the secondary side, a differential circuit inductively connected to both sides of said transformer, a primary winding connected across said differential circuit at points of equal potential, a secondary winding associated with the last-named primary winding, a trip coil for said trip means, a direct-current circuit connected so that when energized said trip coil opens said trip means, rectifying means between said secondary winding and said direct-current circuit, a fuse connected in parallel with said primary winding adapted to blow under transformer fault conditions to unequalize the potential on the primary coil, and an impedance in series with the fuse.

PHILIP H. CHASE.